G. F. AND W. H. COLBERT.
MIRROR SUPPORT.
APPLICATION FILED APR. 13, 1921.

1,392,481. Patented Oct. 4, 1921.

INVENTORS
George F. Colbert
William H. Colbert
By Kay Totten Brown
attys

UNITED STATES PATENT OFFICE.

GEORGE F. COLBERT AND WILLIAM H. COLBERT, OF PITTSBURGH, PENNSYLVANIA.

MIRROR-SUPPORT.

1,392,481.　　　　Specification of Letters Patent.　　Patented Oct. 4, 1921.

Application filed April 13, 1921. Serial No. 460,864.

*To all whom it may concern:*

Be it known that we, GEORGE F. COLBERT and WILLIAM H. COLBERT, citizens of the United States, and residents of Pittsburgh, in the county of Allegheny and State of Pennsylvania, have invented a new and useful Improvement in Mirror-Supports; and we do hereby declare the following to be a full, clear, and exact description thereof.

Our invention relates to mirror-supports, and while the invention is not intended to be limited to any particular purpose, it is especially adapted for use in connection with automobile mirrors which are set up in convenient position at the front of the car so that the driver can obtain a view of the roadway in the rear to guard against accidents from vehicles approaching in that direction.

The object of our invention is to provide a support in which the mirror is rigidly and firmly held so as to prevent the vibration of the mirror, which is liable to result in the cracking or breaking of same, while at the same time the pressure on the mirror is not so great as to tend to crack or break the same by undue pressure.

To these ends our invention comprises the novel features hereinafter set forth and claimed.

Figure 1:
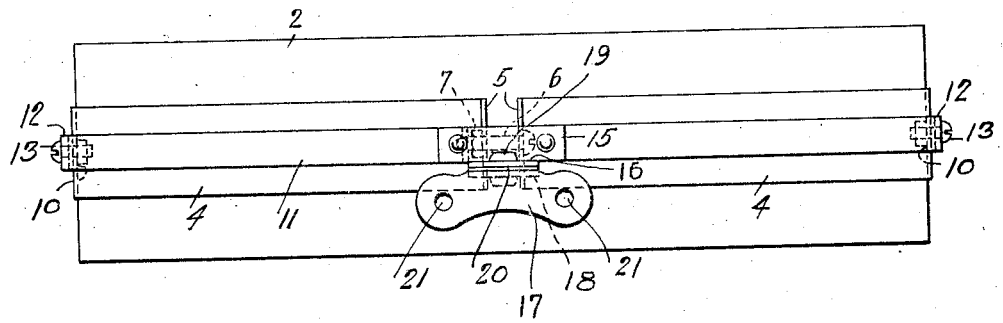
Figure 2:
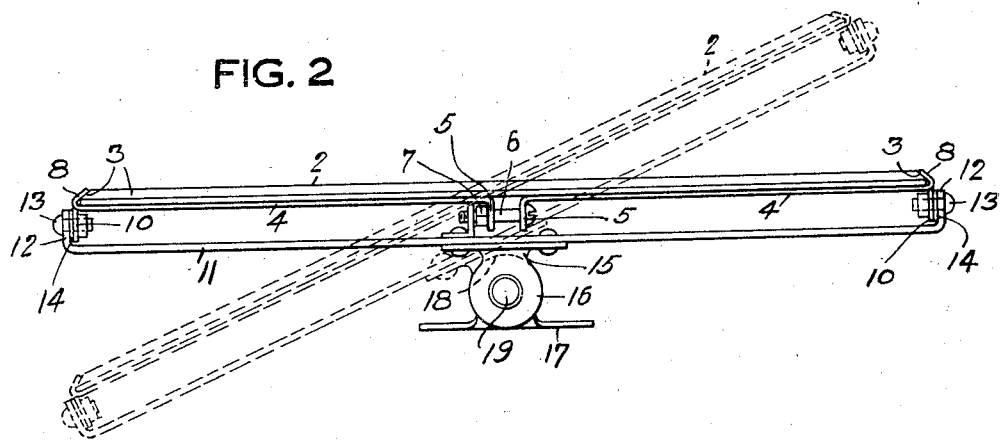
Figure 3:
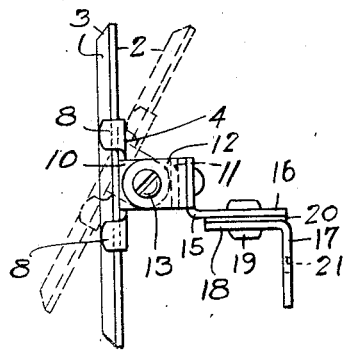
Figure 4:
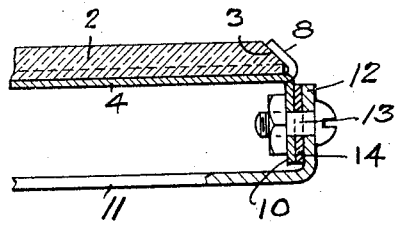

In the accompanying drawings Figure 1 is a rear view of our invention with the mirror-supported therein; Fig. 2 is a plan view; Fig. 3 is an end view, the tilted position being indicated by dotted lines; and Fig. 4 is an enlarged detail.

In the drawing the numeral 2 designates the mirror which is preferably oblong in form with the beveled edges 3. In order to protect the mirror and to prevent the glass from flying in case the mirror should be broken in a collision or other accident, the mirror is preferably backed with leather or like material.

The holder is made up of the following parts:

The clamping plates 4 are formed of metal of proper gage, said clamping plates extending longitudinally along the back of the mirror, and said plates have at their inner ends the lugs 5 with openings therein through which the adjusting screw-bolt 6 passes, provided with the nut 7. It will be apparent that by loosening or tightening the bolt 6 the clamping plates may be adjusted to tighten or loosen their hold on the mirror. At the outer ends of the clamping plates 4 are the outwardly projecting clips 8 which engage the beveled ends of the mirror. The mirror is slipped edgewise into position to engage the clips 8, whereupon, by tightening up the bolt 5, the mirror is securely and firmly clamped in position.

At the outer ends of the clamping plates 4 are the inwardly extending lugs 10 with openings formed therein. A bar 11 has the outwardly projecting end portions 12 which are adapted to register with the lugs 10 on the clamping plates 4, said outwardly extending portions 12 having openings registering with the openings in said lugs. Screw-bolts 13 pass through said openings securing said bar to said clamping plates, forming a pivotal connection so that the mirror may be tilted in a vertical plane to such a position as indicated by dotted lines, Fig. 3. Washers 14, formed of fiber or other suitable material, are interposed between the lugs 10 of the clamping plates 4 and the outwardly projecting portions 12 of the bar 11, said washers creating the necessary friction to hold the mirror in adjusted position, and at the same time allowing for the adjustment of the mirror without undue pressure having to be applied. The fiber washers also tend to prevent vibration and rattling when the car is in motion.

An angle plate 11$^a$ is riveted or otherwise secured to the bar 11, said angle having the opening 11$^b$ through which the screw-bolt 6 passes after passing through the unit 7. This eliminates vibration between the mirror and the frame, and furnishes another friction point to hold the mirror in adjusted position.

Secured to the bar 11 is the extension 15 with the circular plate 16. A bracket 17 has a like circular portion 18 coinciding with the circular portion 16, said parts having registering openings through which the pivoting bolt 19 passes. A fibrous or like washer 20 is interposed between the plates 16 and 18, and provision is thus made for the turning of the plate 16 on the plate 18 for swinging the mirror at an angle, as indicated in Fig. 2, the fiber washer 20 creating sufficient friction to hold the mirror in such adjusted position.

The bracket 17 has the openings 21 to receive screws or like fastening devices for securing the mirror-support in position at any desired place at the front of the car.

By our invention we provide a very simple form of mirror-support in which the mirror is firmly and securely held in place, and yet not so rigidly as to endanger the cracking or breaking of the mirror due to too much pressure. The mirror is engaged at the ends by the clips and is supported and reinforced for its entire length in the back by its clamping plates which gives additional strength.

The mirror is readily adjustable either in a horizontal or vertical plane, and when once adjusted will remain in such adjusted position without tightening up any screws or like devices, the fibrous washers creating the necessary friction and resistance.

What we claim is:

1. The combination with a mirror, of clamping plates extending along the back of said mirror longitudinally thereof, said clamping plates having outwardly projecting clips engaging the ends of the mirror, lugs on said clamping plates, adjusting bolts engaging said lugs, inwardly extending lugs at the outer ends of said clamping plates, a bar having outwardly extending portions pivotally connected to said lugs, a rearwardly extending horizontal portion on said bar, and a bracket having a horizontal portion pivotally connected to said horizontal extension.

2. The combination with the mirror, of clamping plates extending longitudinally in the rear of said mirror, said clamping plates having outwardly extending clips engaging the ends of the mirror, inwardly extending lugs at the inner ends of said clamping plates, an adjusting screw engaging said lugs, inwardly extending lugs at the outer ends of said clamping plates, a longitudinally extending bar having outwardly extending portions pivotally connected to said lugs, a horizontal extension on said bar, a bracket having a corresponding extension pivotally connected to said first extension, and a fibrous washer interposed between said extensions.

3. The combination with the mirror, of clamping plates extending longitudinally in the rear of said mirror, said clamping plates having outwardly extending clips engaging the ends of the mirror, inwardly extending lugs at the inner ends of said clamping plates, an adjusting screw engaging said lugs, a longitudinally extending bar having outwardly extending portions pivotally connected to said lugs, a projection on said bar engaged by said adjusting screw, a bracket, and pivotal connections between said bar and said bracket, whereby the horizontal movement of said mirror may be effected.

In testimony whereof, we, the said GEORGE F. COLBERT and WILLIAM H. COLBERT, have hereunto set our hands.

GEORGE F. COLBERT.
WILLIAM H. COLBERT.

Witnesses:
ROBT. D. TOLTEN,
JOHN F. WILL.